United States Patent
Asakura

(10) Patent No.: US 10,757,555 B2
(45) Date of Patent: *Aug. 25, 2020

(54) COMMUNICATION APPARATUS AND NON-TRANSITORY COMPUTER-READABLE MEDIUM STORING COMPUTER-READABLE INSTRUCTIONS FOR COMMUNICATION APPARATUS

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/439,324

(22) Filed: Jun. 12, 2019

(65) Prior Publication Data

US 2019/0297482 A1 Sep. 26, 2019

Related U.S. Application Data

(63) Continuation of application No. 15/229,219, filed on Aug. 5, 2016, now Pat. No. 10,362,465.

(30) Foreign Application Priority Data

Aug. 5, 2015 (JP) ................... 2015-155532

(51) Int. Cl.
*H04W 84/12* (2009.01)
*H04W 4/80* (2018.01)

(52) U.S. Cl.
CPC .............. *H04W 4/80* (2018.02); *H04W 84/12* (2013.01)

(58) Field of Classification Search
None
See application file for complete search history.

(56) References Cited

U.S. PATENT DOCUMENTS 8,922,820 B2 12/2014 Asai
9,311,030 B2 4/2016 Asai
(Continued)

FOREIGN PATENT DOCUMENTS

JP 2013-201687 A 10/2013
JP 2014-032579 A 2/2014
(Continued)

OTHER PUBLICATIONS

Jun. 23, 2020—(JP) Notification of Reasons for Rejection—App 2019-060065, Eng Tran.

*Primary Examiner* — Sargon N Nano
*Assistant Examiner* — Christopher B Robinson
(74) *Attorney, Agent, or Firm* — Banner & Witcoff, Ltd.

(57) ABSTRACT

A communication apparatus may include: a first interface being set in one of a first operating state and a second operating state; a second interface; and an apparatus controller. The first interface is configured to: receive specific access point information in a case where a wireless connection is established in a situation where the first interface is set in the first operating state; and not receive the specific access point information in a case where a wireless connection via the first interface is established in a situation where the first interface is set in the second operating state. The apparatus controller performs: setting the first interface in the first operating state in a case where the access point information is not registered; registering the specific access point information; and setting the first interface in the second operating state in a case where the specific access point information is registered.

11 Claims, 7 Drawing Sheets

(56) References Cited

U.S. PATENT DOCUMENTS

| | | |
|---|---|---|
| 9,317,233 B2 | 4/2016 | Asai |
| 9,335,957 B2 | 5/2016 | Okamura |
| 9,609,690 B2 | 3/2017 | Shibata |
| 2006/0002352 A1 | 1/2006 | Nakamura |
| 2008/0002352 A1* | 1/2008 | Carnevali ............. G06F 1/1632 361/679.41 |
| 2012/0330764 A1* | 12/2012 | Nahidipour ........ G06Q 20/3278 705/17 |
| 2013/0036231 A1* | 2/2013 | Suumaki ................ H04L 63/18 709/228 |
| 2013/0250357 A1 | 9/2013 | Yu |
| 2014/0038519 A1 | 2/2014 | Asakura |
| 2014/0293331 A1 | 10/2014 | Asai |
| 2014/0293333 A1 | 10/2014 | Asai |
| 2014/0293980 A1 | 10/2014 | Shibata |
| 2014/0340701 A1 | 11/2014 | Okamura |
| 2015/0026317 A1* | 1/2015 | Ilsar .................... H04L 41/0816 709/221 |
| 2015/0257108 A1* | 9/2015 | Hara .................... H04W 48/16 370/311 |
| 2015/0324156 A1 | 11/2015 | Asai |
| 2015/0355875 A1* | 12/2015 | Matsushita ........... G06F 3/1236 358/1.15 |

FOREIGN PATENT DOCUMENTS

| | | |
|---|---|---|
| JP | 2014-195150 A | 10/2014 |
| JP | 2014-195151 A | 10/2014 |
| JP | 2014192822 A | 10/2014 |
| JP | 2014-222865 A | 11/2014 |

* cited by examiner

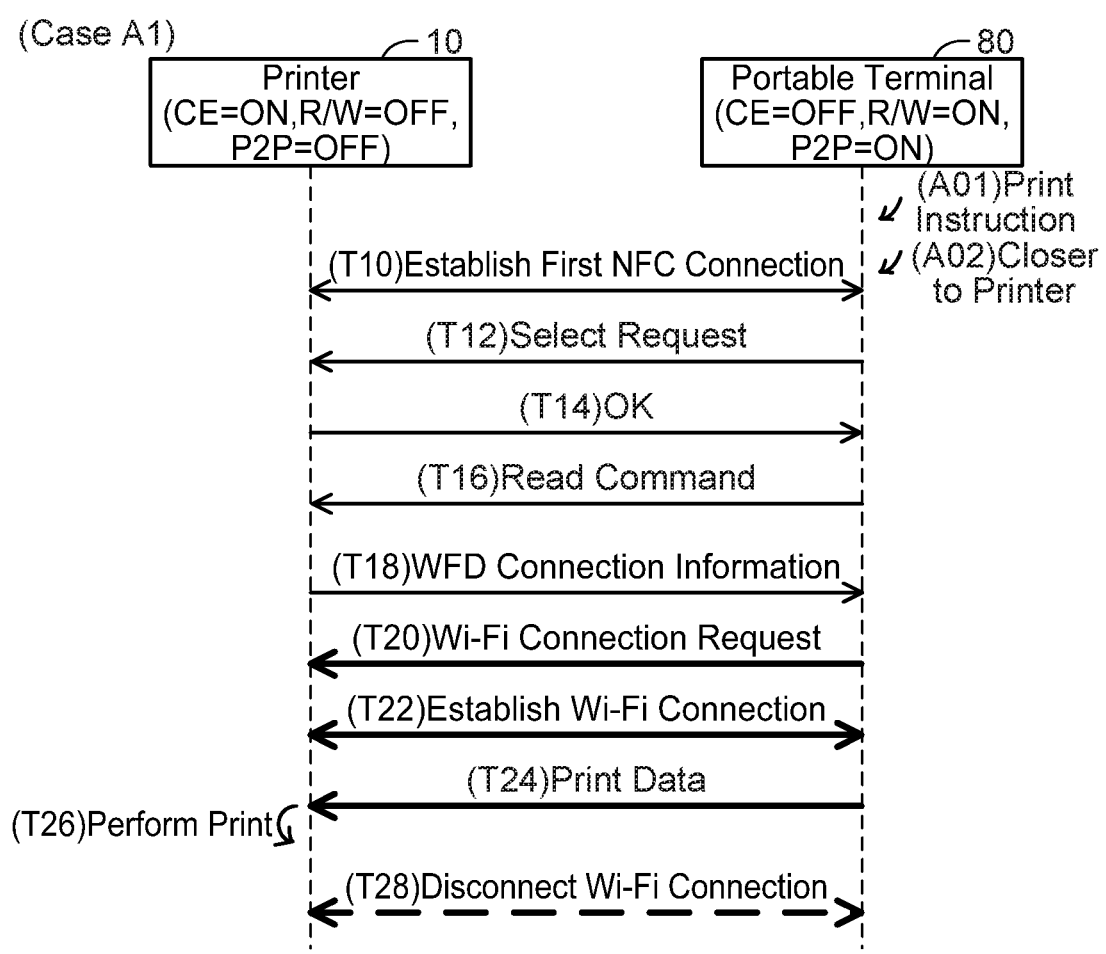

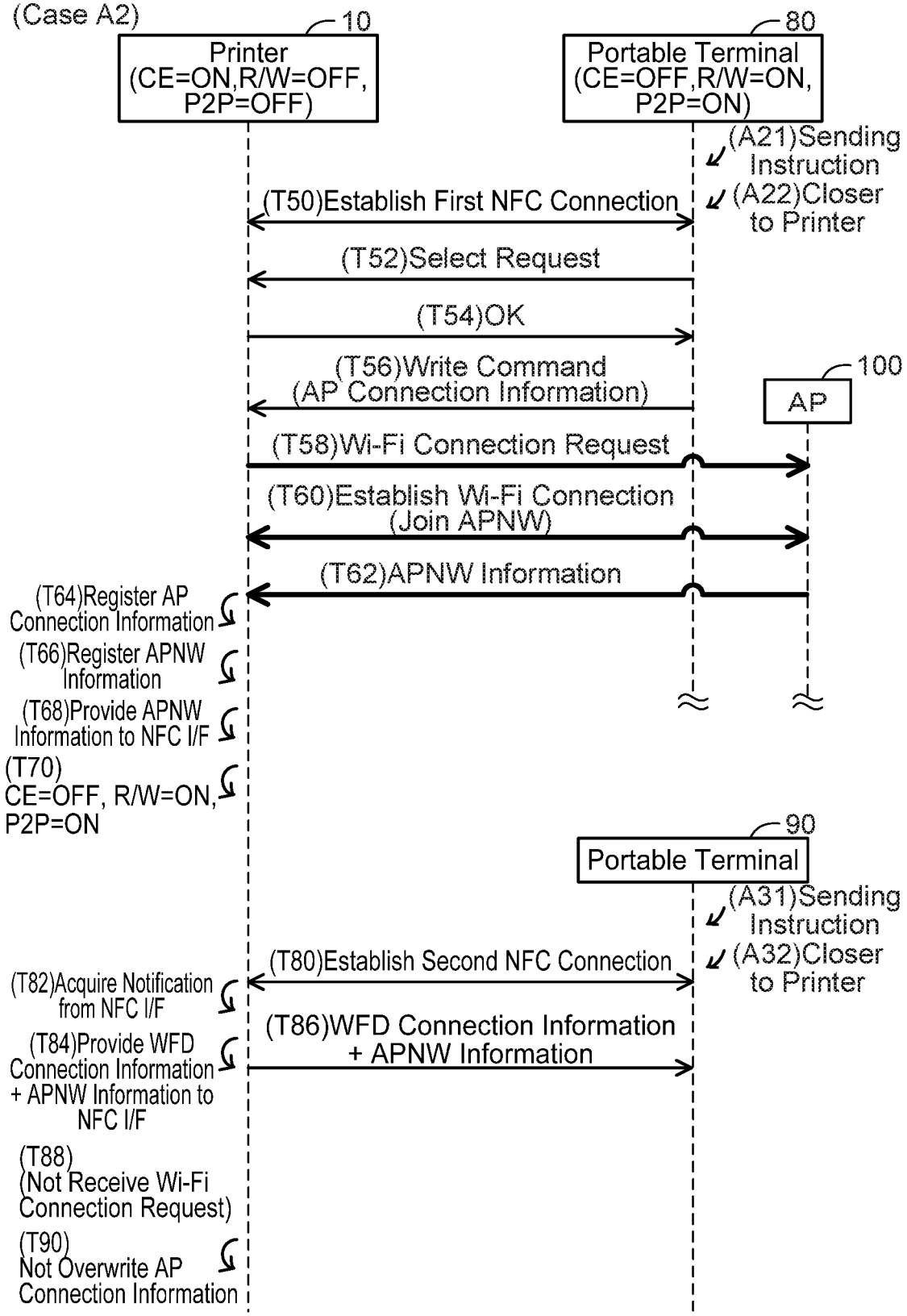

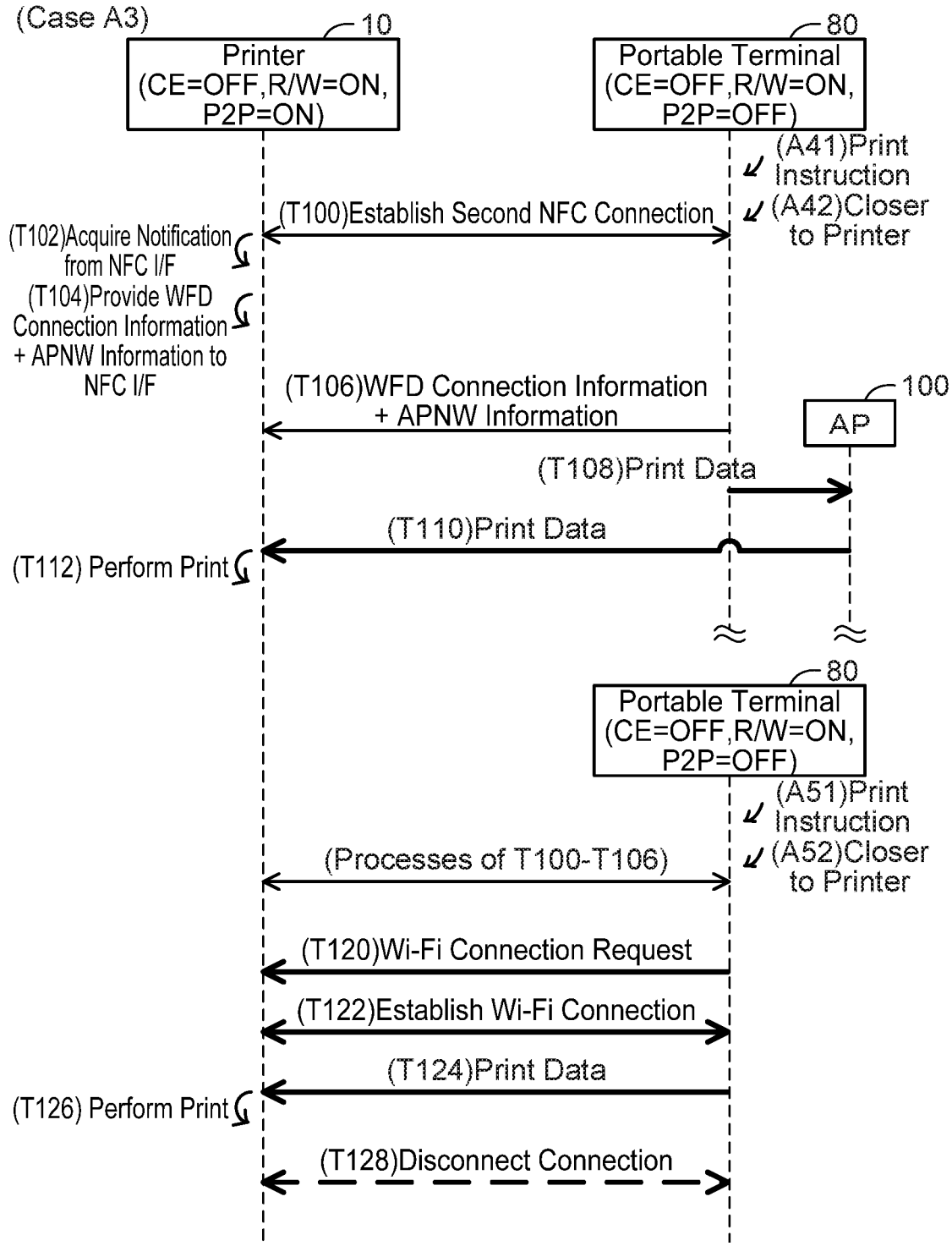

COMMUNICATION APPARATUS AND NON-TRANSITORY COMPUTER-READABLE MEDIUM STORING COMPUTER-READABLE INSTRUCTIONS FOR COMMUNICATION APPARATUS

CROSS-REFERENCE TO RELATED APPLICATION

This application is a continuation of U.S. application Ser. No. 15/229,219, filed Aug. 5, 2016, which claims priority to Japanese Patent Application No. 2015-155532, filed on Aug. 5, 2015, the entire contents of which are hereby incorporated by reference into the present application.

TECHNICAL FIELD

The technique disclosed in the present specification relates to a communication apparatus capable of establishing a wireless connection with an access point.

DESCRIPTION OF RELATED ART

A conventional printer receives access point information used for a wireless connection with an access point, from an operation terminal by performing a tag communication, which is a wireless communication between a tag antenna of a wireless tag for a printer, this tag antenna being provided in the printer, and a first antenna provided in the operation terminal. The printer causes a memory of the printer to store the received access point information, and performs a wireless connection with the access point.

SUMMARY

The above printer receives new access point information from the operation terminal each time a tag communication is performed with the operation terminal, and causes the memory to store the new access point information. That is, in the conventional technique, the access point information in the memory of the printer can change each time the tag communication is performed. Therefore, the access point information can change even in a situation where the printer should not change the access point information in the memory.

In the present specification, a technique is provided capable of suppressing registration of the access point information in a situation where the access point information is not to be registered.

A communication apparatus disclosed in this specification may comprise: a first interface configured to perform a wireless communication in accordance with a first communication scheme, the first interface being set in one of a plurality of operating states including a first operating state and a second operating state different from the first operating state; a second interface configured to perform a wireless communication in accordance with a second communication scheme different from the first communication scheme; an apparatus memory comprising a first registration region in which access point information is to be registered, the access point information being for establishing a wireless connection with an access point via the second interface; and an apparatus controller. The first interface is configured to: receive specific access point information from a first terminal device in a case where a wireless connection between the communication apparatus and the first terminal device via the first interface is established in a situation where the first interface is set in the first operating state; and not receive the specific access point information from a second terminal device in a case where a wireless connection between the communication apparatus and the second terminal device via the first interface is established in a situation where the first interface is set in the second operating state. The apparatus controller is configured to perform: setting the operating state of the first interface in the first operating state in a case where the access point information is not registered in the first registration region; registering the specific access point information in the first registration region in a case where the first interface receives the specific access point information from the first terminal device; and setting the operating state of the first interface in the second operating state in a case where the specific access point information is registered in the registration region.

Moreover, a control method for implementation of the aforementioned communication apparatus, a computer program, and a computer-readable recording medium which stores the computer program, are also novel and useful.

BRIEF DESCRIPTION OF DRAWINGS

FIG. 5 shows a sequence diagram of a case A1 in which a printer performs a print before a Wi-Fi connection is established between the printer and an access point;

FIG. 6 shows a sequence diagram of a case A2 in which a Wi-Fi connection is established between the printer and the access point; and FIG. 7 shows a sequence diagram of a case A3 in which the printer performs a print after a Wi-Fi connection has been established between the printer and the access point.

EMBODIMENT

Figure 1:
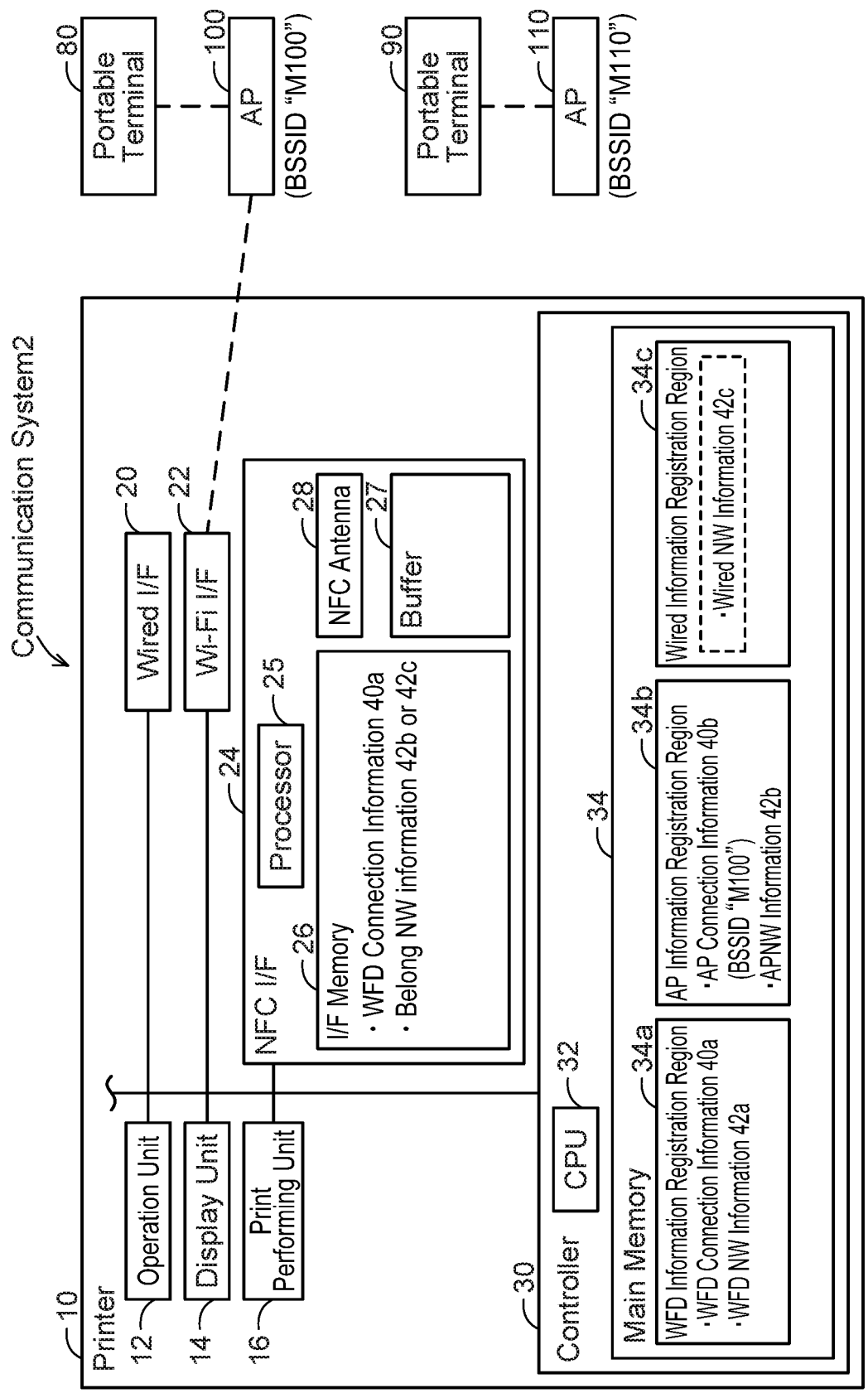
FIG. 1 shows configuration of a communication system.

First Embodiment (Configuration of Communication System 2; FIG. 1)

A communication system 2 comprises a printer 10, portable terminals 80, 90, and APs (abbreviation of Access Point) 100, 110. The printer 10 and the portable terminals 80, 90 are capable of performing a wireless communication in accordance with the Wi-Fi scheme (called "Wi-Fi communication" below), and a wireless communication in accordance with the NFC (abbreviation of Near Field Communication) scheme (called "NFC communication" below).

(Configuration of Printer 10)

The printer 10 is a peripheral apparatus of a PC (abbreviation of Personal Computer), or the like, and is a peripheral apparatus capable of performing a print function. The printer 10 comprises an operation unit 12, a display unit 14, a print performing unit 16, a wired interface 20, a Wi-Fi interface 22, an NFC interface 24, and a controller 30. The units 12 to 30 are connected to a bus wire (reference number omitted). Below, interface may be described as "I/F".

The operation unit 12 comprises a plurality of keys. A user can input various instructions to the printer 10 by operating the operation unit 12. The display unit 14 is a display for displaying various information. The print performing unit 16 comprises an ink jet method, laser method, etc. printing mechanism.

The wired I/F 20 is an I/F for performing a wired communication. When a communication cable (not shown) is connected with the wired I/F 20, the wired I/F 20 transitions from a link down state to a link up state. On the other hand, when the communication cable is removed from the wired I/F 20, the wired I/F 20 transitions from the link up state to the link down state.

The Wi-Fi I/F 22 is an I/F for performing a wireless communication in accordance with the Wi-Fi scheme. The Wi-Fi scheme is a wireless communication scheme conforming to the standards developed by the Wi-Fi Alliance, and is a wireless communication scheme based on e.g., IEEE (abbreviation of The Institute of Electrical and Electronics Engineers, Inc.) standard 802.11 and standards conforming thereto (e.g., 802.11a, 11b, 11g, 11n, etc.). In particular, the Wi-Fi I/F 22 supports the WFD (abbreviation of Wi-Fi Direct (registered trademark)) scheme developed by the Wi-Fi Alliance.

The NFC I/F 24 is a wireless I/F for performing an NFC communication (i.e. a type of near-field wireless communication) in accordance with the NFC scheme. The NFC scheme is a wireless communication scheme based on, e.g., international standard ISO/IEC 21481 or 18092.

The NFC I/F 24 comprises a processor 25, an I/F memory 26, a buffer 27, and an NFC antenna 28. The processor 25 is capable of communicating with the controller 30, and performs various processes in accordance with a program (not shown) in the I/F memory 26.

The I/F memory 26 is a non-volatile memory, and is a memory for storing information for sending to an external. WFD connection information 40a and belong network information 42b (or 42c) are stored in the I/F memory 26. Below, network may be referred to as "NW".

The WFD connection information 40a is information for establishing a Wi-Fi connection with the printer 10 which is operating as a parent station (i.e., G/O (Group Owner)) of a WFD NW, and includes various information (i.e., SSID (abbreviation of Service Set Identifier), password, authentication scheme, encryption scheme) used in the WFD NW in which the printer 10 operates as the G/O.

The belong NW information is either AP NW information 42b or wired NW information 42c. The AP NW information 42b is information used for performing a Wi-Fi communication with the printer 10 via an AP (e.g., the AP 100), and includes various information (i.e., MAC address, IP address, subnet mask, and UUID (abbreviation of Universally Unique Identifier) of the printer 10) of the printer 10 used in an AP NW formed by the AP.

In a case where the wired I/F 20 is linked up, the wired NW information 42c is stored in the I/F memory 26. The wired NW information 42c is information used for performing a wired communication with the printer 10 via the wired NW, and includes various information (i.e., MAC address, IP address, subnet mask, UUID of the printer 10) of the printer 10 used in the wired NW.

In the example of FIG. 1, the printer 10 has established a Wi-Fi connection with the AP 100. Further, the wired I/F 20 of the printer 10 is not linked up. Therefore, in the example of FIG. 1, the belong NW information being stored in the I/F memory 26 is the AP NW information 42b. Below, the description of the configuration of the printer 10 will continue in accordance with the example of a Wi-Fi connection being established between the printer 10 and the AP 100 (i.e., the example of FIG. 1).

The buffer 27 is a volatile memory, and is a memory for temporarily storing information received from an external via the NFC I/F 24. The NFC antenna 28 is an antenna for receiving or sending various data when performing an NFC communication with another apparatus.

Moreover, an I/F called an NFC forum device, and an I/F called an NFC tag, are known as I/F types for performing an NFC communication. In the present embodiment, the NFC I/F 24 is an NFC forum device.

The NFC forum device is an I/F capable of selectively operating in any mode of P2P (abbreviation of Peer To Peer) mode, R/W (abbreviation of Reader/Writer) mode, and CE (abbreviation of Card Emulation) mode. For example, in a case where both an NFC I/F of a first apparatus and an NFC I/F of a second apparatus are operating in P2P mode, the first and second apparatuses can perform two-way communication of data. Further, e.g., in a case where the NFC I/F of the first apparatus is operating in Reader mode of R/W mode, and the NFC I/F of the second apparatus is operating in CE mode, the first apparatus can read out data from the second apparatus, i.e., can perform reception of data from the second apparatus. Further, e.g., in a case where the NFC I/F of the first apparatus is operating in Writer mode of R/W mode, and the NFC I/F of the second apparatus is operating in CE mode, the first apparatus can write data to the second apparatus, i.e., can perform sending of data to the second apparatus.

On the other hand, the NFC tag is not an I/F capable of selectively operating in any mode of the three modes described above, but is an I/F functioning as an IC tag.

Figure 3:
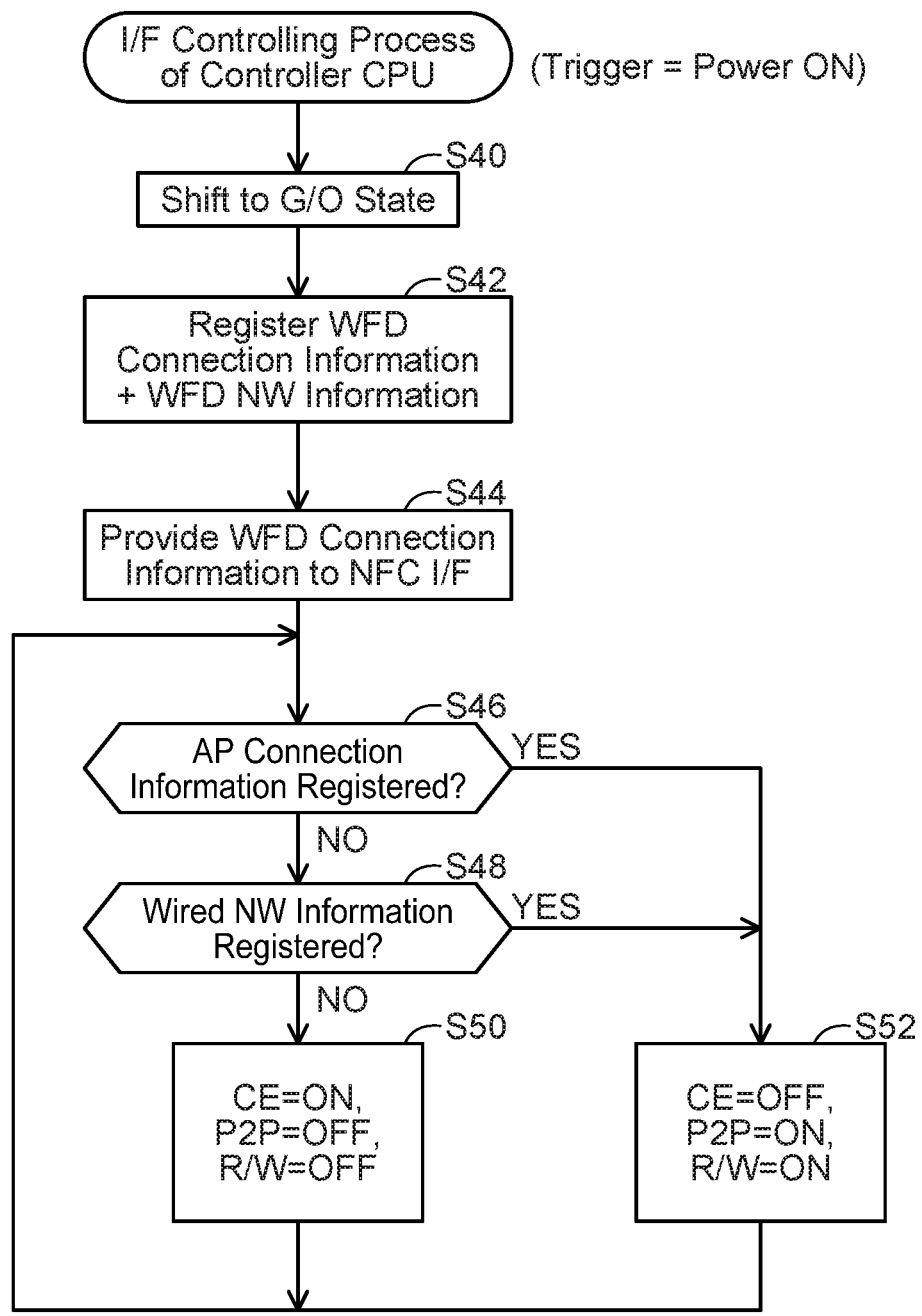
FIG. 3 shows a flowchart of an I/F controlling process of a CPU of a controller.

In the present embodiment, an operating state of the NFC I/F 24, which is an NFC forum device, is set in either a first operating state in which CE mode is turned ON (i.e. activated), and R/W mode and P2P mode are turned OFF (i.e. invalidated), or a second operating state in which CE mode is turned OFF, and R/W mode and P2P mode are turned ON (see FIG. 3).

In a case where the operating state of the NFC I/F 24 is set in the aforementioned first operating state, the NFC I/F 24 operates in the same manner as an IC tag of the NFC scheme (i.e. NFC tag). There are a plurality of types of NFC tag, including Type 4 and Type 3. Each type has a different radio wave modulation scheme and communication rules. Specifically, Type 4 is a communication Type defined by the international standard of ISO/IEC 14443, and Type 3 is a communication Type defined by the international standard of ISO/IEC 18092. Differences between Type 4 and Type 3 will be described briefly. For example, in a case where a terminal device is to send either of a Write command or Read command to the Type 4 NFC tag, before sending either command, the terminal device sends a Select Request for confirming ability of the NFC tag for each command. The terminal device sends the command to be sent when receiving from the NFC tag a signal indicating ability to process the command to be sent, and does not send the command to be sent when receiving from the NFC tag a signal indicating inability to process the command to be sent. By contrast, in a case where the terminal device is to send commands to the Type 3 NFC tag, the terminal device sends the commands without sending a Select Request. The NFC I/F 24 of the present embodiment operates in the same manner as the Type 4 NFC tag in the case of operating in the first operating state.

Below, an NFC connection established between the printer 10 in which CE mode is ON and the portable terminal 80 in which R/W mode is ON, is called "first NFC connection", and an NFC connection established between the printer 10 in which P2P mode is ON and the portable terminal 80 in which P2P mode is ON is called "second NFC connection".

Here, differences between the Wi-Fi I/F 22 and the NFC I/F 24 will be described. A communication speed of a wireless communication via the Wi-Fi I/F 22 (e.g., maximum communication speed is 11 to 600 Mbps) is faster than a communication speed of a wireless communication via the NFC I/F 24 (e.g., maximum communication speed is 100 to 424 Kbps). Further, a frequency of a carrier wave (e.g. a 2.4 GHz band or a 5.0 GHz band) upon a wireless communication via the Wi-Fi I/F 22 is different from a frequency of a carrier wave (e.g. a 13.56 MHz band) upon a wireless communication via the NFC I/F 24. Further, a maximum distance of a wireless communication that can be performed via the Wi-Fi I/F 22 (e.g., about 100 m at maximum) is greater than a maximum distance of a wireless communication that can be performed via the NFC I/F 24 (e.g., about 10 cm at maximum).

The controller 30 comprises a CPU 32 and a main memory 34. The CPU 32 is a processor which performs various processes in accordance with a program stored in the main memory 34. The main memory 34 is configured by a RAM, ROM, etc., and stores various information in addition to the aforementioned program. Further, the main memory 34 comprises a WFD information registration region 34a, an AP information registration region 34b, and a wired information registration region 34c.

The WFD information registration region 34a is a region for registration of information related to the WFD NW in which the printer 10 is operating as a parent station (i.e. G/O). Specifically, the WFD connection information 40a and the WFD NW information 42a are registered in the WFD information registration region 34a. The WFD NW information 42a is information used for performing a wireless communication with the printer 10 by using the WFD NW in which the printer 10 is operating as G/O. Specifically, the WFD NW information 42a includes various information (i.e., MAC address, IP address, subnet mask, UUID of the printer 10) of the printer 10 used in the WFD NW in which the printer 10 is operating as G/O.

The AP information registration region 34b is a region for registration of information related to the AP NW formed by the AP 100 with which the printer 10 has established a Wi-Fi connection. Specifically, AP connection information 40b and the AP NW information 42b are registered in the AP information registration region 34b. The AP connection information 40b includes various information (i.e., SSID of the AP NW, password, BSSID of the AP NW (abbreviation of Basic Service Set Identifier), specifically, a MAC address "M100" of the AP 100) used for establishing a Wi-Fi connection with the AP 100.

The wired information registration region 34c is a region for registration of the wired NW information 42c. In the example of FIG. 1, the wired I/F 20 has not been linked up, and the wired NW information 42c has not been registered in the wired information registration region 34c. Therefore, in FIG. 1, the wired NW information 42c in the wired information registration region 34c is shown by a broken line.

(Configuration of Portable Terminals 80, 90)

The portable terminal 80 is a portable terminal device such as a mobile telephone (e.g. a smartphone), a PDA, a notebook PC, a tablet PC, a portable music playback device or a mobile movie playback device. The portable terminal 80 comprises a Wi-Fi I/F similar to the Wi-Fi I/F 22 of the printer 10. Further, the portable terminal 80 comprises an NFC I/F. The NFC I/F of the portable terminal 80 is the aforementioned NFC forum device. The NFC I/F of the portable terminal 80 is operating in a state in which R/W mode and P2P mode are ON, and CE mode is OFF. The portable terminal 80 further comprises an operation unit, display unit, controller, etc. (not shown). The portable terminal 90 has the same configuration as the portable terminal 80. Moreover, the portable terminal 80 has established a Wi-Fi connection with the AP 100, and the portable terminal 90 has established a Wi-Fi connection with an AP 110.

(Configuration of APs 100, 110)

The APs 100, 110 operate as a parent station of a Wi-Fi NW (i.e. the AP NW), forming the AP NW. The printer 10 and the portable terminal 80 belong as child stations (specifically, stations) to the AP NW formed by the AP 100. The AP 100 relays Wi-Fi communication between the printer 10 and the portable terminal 80. The portable terminal 90 belongs as a child station to the AP NW formed by the AP 110. The BSSID (i.e., the MAC address of the AP 100) of the AP NW formed by the AP 100 is "M100". The BSSID (i.e., the MAC address of the AP 110) of the AP NW formed by the AP 110 is "M110".

(Process when Power of Printer 10 is Turned ON)

Figure 2:
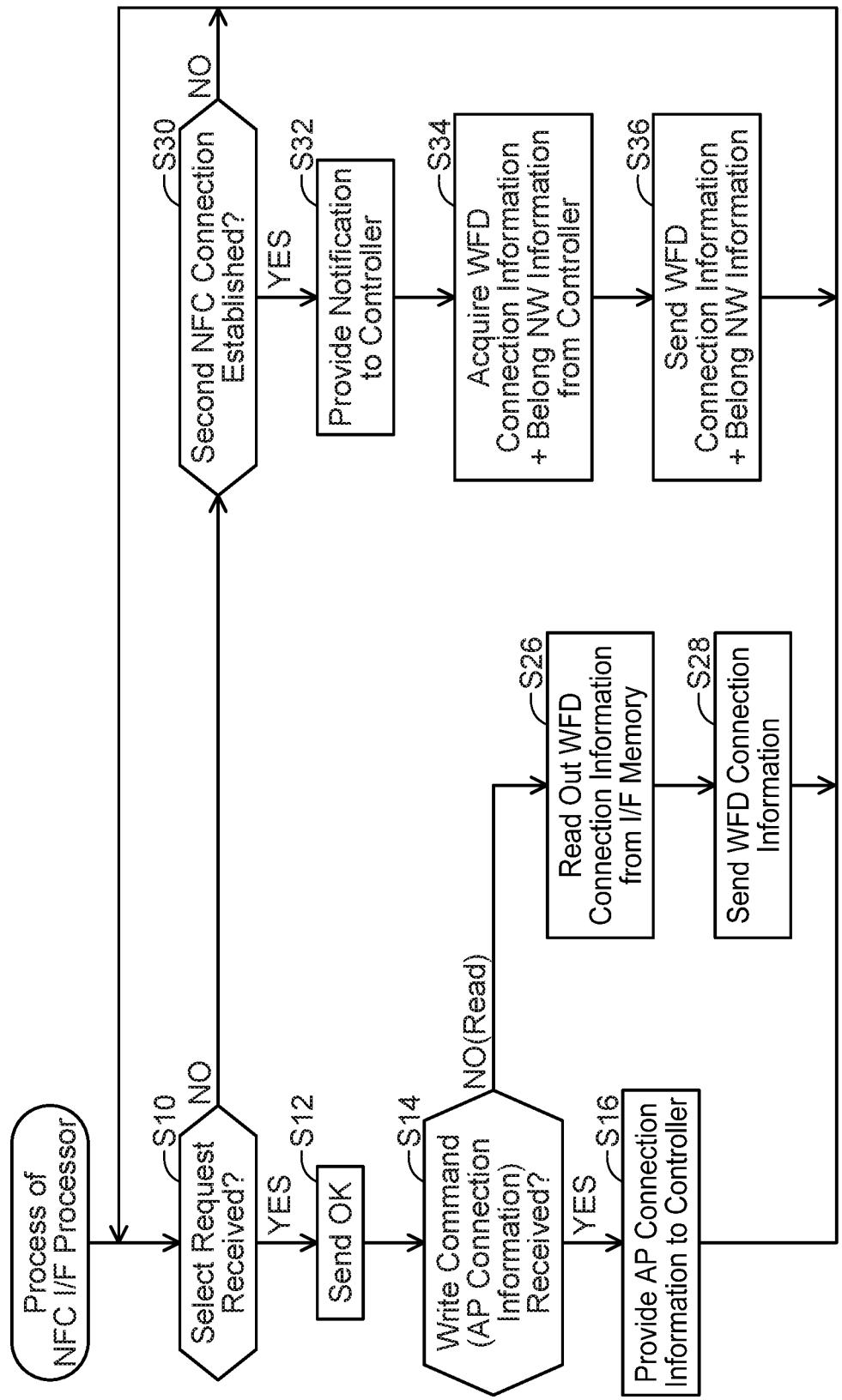
FIG. 2 shows a flowchart of processes of a processor of an NFC interface.
Figure 4:
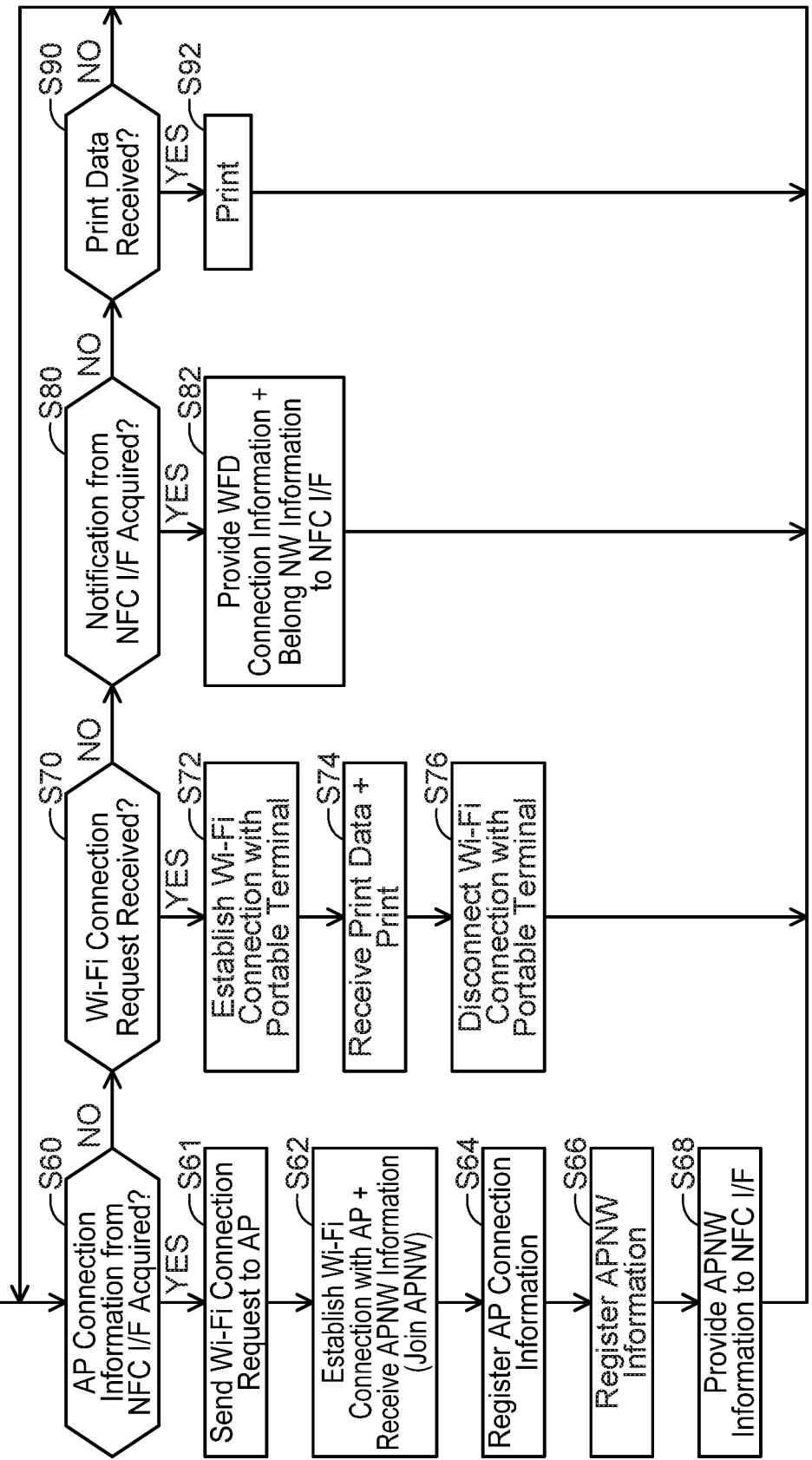
FIG. 4 shows a flowchart of a main process of the CPU of the controller.

In a case where the power of the printer 10 is turned ON, the processor 25 of the NFC I/F 24 starts the processes of FIG. 2, and the CPU 32 of the controller 30 starts the processes of FIG. 3 and FIG. 4. Apart from the processes of FIG. 3 and FIG. 4, the CPU 32 of the controller 30 further performs a process (not shown) in accordance with a state of the wired I/F 20. This process will be described first before describing the processes of FIG. 2 to FIG. 4.

(Process in Accordance with State of Wired I/F)

Regardless of whether the AP connection information 40b and the AP NW information 42b have been registered in the AP information registration region 34b of the main memory 34, when the wired I/F 20 transitions from the link down state to the link up state, the CPU 32 registers the wired NW information 42c (see FIG. 1) in the wired information registration region 34c of the main memory 34. Further, the CPU 32 provides the wired NW information 42c to the NFC I/F 24. Thereby, the wired NW information 42c is stored as the belong NW information in the I/F memory 26 of the NFC I/F 24. Then, when the wired I/F 20 transitions from the link up state to the link down state, the CPU 32 deletes the wired NW information 42c from the wired information registration region 34c of the main memory 34 and, further, provides a deletion instruction to the I/F memory 26, deleting the wired NW information 42c from the I/F memory 26.

(Process of Processor 25 of NFC I/F 24; FIG. 2)

Next, a process performed by the processor 25 of the NFC I/F 24 when power of the printer 10 is turned ON will be described with reference to FIG. 2. First, the processor 25 performs monitoring of S10, S30.

In S10, the processor 25 monitors whether a Select Request is received from a portable terminal (e.g., the portable terminal 80). In a case where a user of the portable terminal wishes to cause the printer 10 also to join the AP NW which the portable terminal has joined, the user brings the portable terminal closer to the printer 10 after inputting, to the portable terminal, a predetermined sending instruction for sending AP connection information to the printer 10. Further, in a case where the user of the portable terminal wishes to cause the printer 10 to perform a print, the user brings the portable terminal closer to the printer 10 after inputting a predetermined print instruction to the portable terminal. Below, the portable terminal, which is brought closer to the printer 10, is called "target terminal". In this case, if the operating state of the NFC I/F 24 of the printer 10 has been set to the aforementioned first operating state, a first NFC connection is established when a distance between the NFC I/F of the target terminal and the NFC I/F 24 of the printer 10 becomes less than a predetermined distance (e.g., 10 cm). In that case, the portable terminal first sends, to the printer 10, a Select Request for confirming ability of the NFC tag for the Write command and Read command. In this case, the processor 25 receives the Select Request from the target terminal, determines YES in S10, and proceeds to S12.

In S12, the processor 25 sends to the target terminal an OK signal indicating that the NFC I/F 24 is compatible for both the Write command and the Read command. When receiving the OK signal, the target terminal sends the Write command including the AP connection information being stored in the target terminal to the printer 10 in a case where the aforementioned predetermined sending instruction has been input, and sends the Read command to the printer 10 in a case where the aforementioned print instruction has been input.

In S14, the processor 25 monitors whether the Write command including the AP connection information is received from the target terminal, or whether the Read command is received from the target terminal. Here, in a case where the Write command is received, YES is determined in S14, and the processor 25 temporarily stores the received AP connection information in the buffer 27 of the NFC I/F 24.

In S16, the processor 25 provides the AP connection information that was stored in the buffer 27 to the controller 30 without causing the I/F memory 26 to store the AP connection information. When S16 ends, the process returns to the monitoring of S10, S30.

Unlike the present embodiment, the processor of the NFC I/F may adopt a configuration in which the AP connection information is caused to be stored by the I/F memory before being registered in the AP information registration region. In that case, there is a possibility that the AP connection information for registration in the AP information registration region is read out by another terminal device. By contrast, in the present embodiment, as described above, the processor 25 provides the AP connection information for registration in the AP information registration region 34b to the controller 30 without storing the AP connection information in the I/F memory 26 (S16). Therefore, it is possible to suppress occurrence of the AP connection information for registration in the AP information registration region 34b being read out by another terminal device.

On the other hand, in a case where the Read command is received in S14, NO is determined in S14, and the process proceeds to S26. In S26, the processor 25 reads out the WFD connection information 40a from the I/F memory 26. In S28, the processor 25 sends the WFD connection information 40a to the target terminal. When S28 ends, the process returns to the monitoring of S10, S30.

On the other hand, in S30 the processor 25 monitors whether a second NFC connection is established. In a case where the operating state of the NFC I/F 24 of the printer 10 is set in the aforementioned second operating state, the second NFC connection is established when the user brings the target terminal closer to the printer 10 regardless of which instruction of the aforementioned sending instruction or the print instruction the user of the target terminal has input to the target terminal. In this case, the processor 25 determines YES in S30, and proceeds to S32.

In S32, the processor 25 provides a predetermined notification (called "notification" below) indicating that the second NFC connection has been established, to the controller 30. As will be described later, upon acquiring the notification from the NFC I/F 24 (YES in S80 of FIG. 4), the CPU 32 of the controller 30 provides, to the NFC I/F 24, the WFD connection information 40a being stored in the WFD information registration region 34a, and the belong NW information (i.e., the AP NW information 42b being stored in the AP information registration region 34b or the wired NW information 42c being stored in the wired information registration region 34c) (S82 of FIG. 4).

In S34, the processor 25 acquires the WFD connection information 40a and the belong NW information 42b (or 42c) provided from the controller 30 (see S82 of FIG. 4). In S36, which is subsequent, the processor 25 provides the WFD connection information 40a and the belong NW information 42b (or 42c) acquired in S34 to the target terminal. Upon ending S36, the process returns to the monitoring of S10, S30.

(I/F Controlling Process of CPU 32 of Controller 30; FIG. 3)

Next, an I/F controlling process of the CPU 32 of the controller 30 will be described with reference to FIG. 3. In S40, the CPU 32 shifts the operating state of the printer 10 from a device state to the G/O state of the WFD scheme. Thereby, the CPU 32 operates as the G/O of the WFD NW, and forms the WFD NW in which the printer 10 operates as a parent station.

Next, in S42, the CPU 32 registers the WFD connection information 40a and the WFD NW information 42a in the WFD information registration region 34a (see FIG. 1). The WFD connection information is prepared as follows. The CPU 32 generates an SSID and password by, e.g., randomly selecting a character string. The CPU 32 prepares this information by acquiring the predetermined authentication scheme and encryption scheme from the main memory 34. The WFD NW information is prepared as follows. The CPU 32 prepares these information by acquiring the predetermined MAC address, subnet mask, and UUID of the printer 10 from the main memory 34. The CPU 32 prepares the IP address of the printer 10 by, e.g., determining one number value from a predetermined number value range.

In S44, the CPU 32 provides the WFD connection information 40a to the NFC I/F 24. Thereby, the WFD connection information 40a is stored in the I/F memory 26.

In S46, the CPU 32 determines whether the AP connection information 40b has been registered in the AP information registration region 34b. In the case where the AP connection information 40b has been registered in the AP information registration region 34b, the CPU 32 determines YES in S46, and proceeds to S52. On the other hand, in the case where the AP connection information 40b has not has been registered in the AP information registration region 34b, the CPU 32 determines NO in S46, and proceeds to S48.

In S48, the CPU 32 determines whether the wired NW information 42c has been registered in the wired information registration region 34c. In the case where the wired NW information 42c has been registered in the wired information registration region 34c, the CPU 32 determines YES in S48, and proceeds to S52. On the other hand, in the case where the wired NW information 42c has not been registered in the wired information registration region 34c, the CPU 32 determines NO in S48, and proceeds to S50.

In S50, the CPU 32 sets the operating state of the NFC I/F 24 to a state in which CE mode is turned ON, and R/W mode and P2P mode are turned OFF (i.e. the first operating state). In a case where the operating state of the NFC I/F 24 is already set in the first operating state at the time of S50, in S50 the CPU 32 does not change the operating state of the NFC I/F 24. Upon ending S50, the process returns to S46.

On the other hand, in S52, the CPU 32 sets the operating state of the NFC I/F 24 to a state in which CE mode is turned OFF, and R/W mode and P2P mode are turned ON (i.e. the second operating state). In a case where the operating state of the NFC I/F 24 is already set in the second operating state at the time of S52, in S52 the CPU 32 does not change the operating state of the NFC I/F 24. Upon ending S52, the process returns to S46.

(Main Process of CPU 32 of Controller 30; FIG. 4)

Next, a main process of the CPU 32 of the controller 30 will be described with reference to FIG. 4. As described above, when the power of the printer 10 is turned ON, the CPU 32 starts the processes of FIG. 4. The CPU 32 starts monitoring of S60, S70, S80, S90.

In S60, the CPU 32 monitors whether the AP connection information is acquired from the NFC I/F 24. As described above, upon receiving the AP connection information from the target terminal (YES in S14 of FIG. 2), the NFC I/F 24 provides the received AP connection information to the controller 30 (S16). In this case, the CPU 32 acquires the AP connection information from the NFC I/F 24. In this case, the CPU 32 determines YES in S60, and proceeds to S61.

In S61, the CPU 32 sends a Wi-Fi connection request to an AP (e.g., the AP 100) via the Wi-Fi I/F 22. Specifically, the CPU 32 sends a Wi-Fi connection request (Probe Request) including the SSID in the AP connection information acquired in S60, to the AP. Below, the AP using the SSID in the Wi-Fi connection request, i.e., the AP that is a destination of the Wi-Fi connection request, is called "target AP".

In S62, the CPU 32 performs a Wi-Fi connection process, and establishes a Wi-Fi connection with the target AP. Specifically, the CPU 32 sends an Authentication Request and Association Request and, further, performs a 4-way handshake with the target AP. Thereby, the printer 10 can join, as a child station, the AP NW formed by the target AP. The CPU 32 further receives the AP NW information from the target AP.

In S64, the CPU 32 registers the AP connection information 40*b* acquired in S60 in the AP information registration region 34*b*. In S66, the CPU 32 registers the AP NW information 42*b* received in S62 in the AP information registration region 34*b*. In S68, the CPU 32 provides the AP connection information 40*b* acquired in S62 to the NFC I/F 24. Thereby, the AP NW information 42*b* is stored as the belong NW information in the I/F memory 26 of the NFC I/F 24. When S68 ends, the process returns to the monitoring of S60, S70, S80, S90.

On the other hand, in S70, the CPU 32 monitors whether a Wi-Fi connection request is received from the target terminal via the Wi-Fi I/F 22. In a case of receiving the WFD connection information 40*a* (see S28, S36 of FIG. 2), the target terminal can send a Wi-Fi connection request (specifically, a Probe Request) including the SSID in the WFD connection information 40*a* to the printer 10. Upon receiving the Wi-Fi connection request from the target terminal, the CPU 32 determines YES in S70, and proceeds to S72.

In S72, the CPU 32 performs a Wi-Fi connection process, and establishes a Wi-Fi connection with the target terminal. Specifically, upon receiving the Wi-Fi connection request (i.e. Probe Request), the CPU 32 sends a response signal (i.e. Probe Response) to the target terminal. Next, the CPU 32 receives an Authentication Request and Association Request from the target terminal, and sends a response signal to the target terminal. Then, the CPU 32 performs a 4-way handshake with the target terminal. When the aforementioned processes end, the Wi-Fi connection with the target terminal is established. The CPU 32 writes the MAC address of the target terminal in an administration list (not shown). Thereby, the CPU 32 can cause the target terminal to join, as a child station (i.e. client), the WFD NW formed in S40 of FIG. 3.

In S74, the CPU 32 receives print data from the target terminal via the Wi-Fi I/F 22 by using the WFD NW, provides the print data to the print performing unit 16, and performs a print in accordance with the print data by causing the print performing unit 16 to perform a print of an image represented by the print data.

In S76, the CPU 32 disconnects the Wi-Fi connection with the target terminal by deleting the MAC address of the target terminal from the administration list. When S76 ends, the process returns to the monitoring of S60, S70, S80, S90.

On the other hand, in S80, the CPU 32 monitors whether the notification is acquired from the NFC I/F 24. As described above, in a case where the second NFC connection is established, the NFC I/F 24 provides the notification to the controller 30 (S32 of FIG. 2). In this case, the CPU 32 acquires the notification from the NFC I/F 24. In this case, the CPU 32 determines YES in S80, and proceeds to S82.

In S82, the CPU 32 provides, to the NFC I/F 24, the WFD connection information 40*a* in the WFD information registration region 34*a*, and the belong NW information in the main memory 34 (i.e., the AP NW information 42*b* in the AP information registration region 34*b* or the wired NW information 42*c* in the wired information registration region 34*c*). Upon ending S82, the process returns to the monitoring of S60, S70, S80, S90.

On the other hand, in S90 the CPU 32 monitors whether print data is received from the target terminal. In a case where the target terminal has already belonged to the same NW as the printer 10, the CPU 32 does not receive the aforementioned Wi-Fi connection request from the target terminal (NO in S70). For example, if the printer 10 has already established a Wi-Fi connection with the AP 100, the target terminal receives both the WFD connection information 40*a* and the AP NW information 42*b* from the printer 10 (S36 of FIG. 2). The target terminal attempts a Wi-Fi communication with the printer 10 via the AP 100 by using the information included in the AP NW information 42*b*. If the communication succeeds, it is confirmed that the target terminal and the printer 10 are belonging to the same AP NW. In that case, the target terminal sends print data to the printer 10 via the AP 100 without sending the aforementioned Wi-Fi connection request to the printer 10. Further, e.g., if the wired I/F 20 of the printer 10 is linked up, the target terminal receives both the WFD connection information 40*a* and the wired NW information 42*c* from the printer 10 (S36 of FIG. 2). By performing a Wi-Fi communication via the AP 100 by using the information included in the wired NW information 42*c*, the target terminal attempts communication with the printer 10 via a wired LAN which may be connected with the AP 100. If the communication succeeds, it is confirmed that the target terminal and the printer 10 are belonging to the same wired NW. In that case, the target terminal sends print data to the printer 10 by using the wired NW without sending the aforementioned Wi-Fi connection request to the printer 10. In this case, the CPU 32 acquires the print data via the Wi-Fi I/F 22 or the wired I/F 20. The CPU 32 determines YES in S90, and proceeds to S92.

In S92, the CPU 32 performs a print in accordance with the print data received in S90. Upon ending S92, the process returns to the monitoring of S60, S70, S80, S90.

As described above, in the present embodiment, in the case where the AP connection information is not registered in the AP information registration region 34*b*, and the wired I/F 20 is not linked up, the processor 25 receives the Write command including the AP connection information from the target terminal (S10 to S16). The CPU 32 registers the AP connection information in the AP information registration region 34*b* (S60 to S64 of FIG. 4). On the other hand, in the case where the AP connection information is not registered in the AP information registration region 34*b*, and the wired I/F 20 is linked up, the processor 25 does not receive the Write command including the AP connection information from the target terminal (YES in S30). That is, in the present embodiment, the printer 10 can switch whether to register the AP connection information in the AP information registration region 34*b* in response to whether the wired I/F 20 is linked up. On the other hand, in a case where the printer 10 is configured such that while one of the wired I/F 20 and the Wi-Fi I/F 22 is being used, the other thereof cannot be used, in order to reduce processing load caused by communication, there is a possibility that, while the wired I/F 20 is linked up, the wired NW may be disconnected at the time of allowing the registration of the AP connection information for performing a Wi-Fi connection with the AP. In the present embodiment, it is possible to suppress occurrence of the aforementioned situation.

(Specific Case)

Next, specific cases A1 to A3 realized by the flowcharts of FIG. 2 to FIG. 4 will be described with reference to FIG. 5 to FIG. 7.

(Case A1; FIG. 5)

Case A1 shows a case in which the printer 10 receives print data from the portable terminal 80 and performs a print before a Wi-Fi connection between the printer 10 and the AP 100 is established. Moreover, at a start time of case A1, the AP connection information 40*b* has not been registered in the AP information registration region 34*b* of the printer 10, and the wired NW information 42*c* has also not been registered in the wired information registration region 34*c* (i.e., the wired I/F 20 is not linked up). That is, at the start time of case A1, the operating state of the NFC I/F 24 of the printer 10 is set in the first operating state (i.e., CE mode is ON, R/W mode and P2P mode are OFF). Further, at the start time of case A1, the portable terminal 80 has established a Wi-Fi connection with the AP 100, and the portable terminal 90 has established a Wi-Fi connection with the AP 110 (see FIG. 1).

In A01, the user of the portable terminal 80 inputs a predetermined print instruction to the portable terminal 80. Next, in A02, the user of the portable terminal 80 brings the portable terminal 80 closer to the printer 10.

In T10, a first NFC connection between the NFC I/F of the portable terminal 80 and the NFC I/F 24 of the printer 10 is established by the distance between these I/Fs becoming less than a predetermined distance (e.g., 10 cm).

In T12, the printer 10 receives a Select Request from the portable terminal 80 (YES in S10 of FIG. 2) and, in T14, sends an OK signal to the portable terminal 80 (S12). Next, in T16 the printer 10 receives a Read command for requesting sending of the information in the I/F memory 26, from the portable terminal 80 (NO in S14 of FIG. 2) and, in T18, sends the WFD connection information 40*a* being stored in the I/F memory 26 to the portable terminal 80 (S26, S28 of FIG. 2).

In T20, the printer 10 receives a Wi-Fi connection request including the SSID in the WFD connection information 40*a* (T18) from the portable terminal 80 (YES in S70 of FIG. 4) and, in T22, establishes a Wi-Fi connection with the portable terminal 80 (S72). Next, in T24, upon receiving print data from the portable terminal 80, in T26 the printer 10 performs a print in accordance with the received print data (S74). Next, in T28, the printer 10 disconnects the Wi-Fi connection with the portable terminal 80 (S76).

As described above, in the present embodiment, in a situation where the NFC I/F 24 is set in the first operating state, the printer 10 can send the WFD connection information 40*a* in the I/F memory 26 to the portable terminal 80. Therefore, the printer 10 can establish a Wi-Fi connection with the portable terminal 80 via the Wi-Fi I/F 22. Therefore, it is possible to cause the portable terminal 80 to join the WFD NW formed by the printer 10.

(Case A2; FIG. 6)

Case A2 shows a case in which a Wi-Fi connection between the printer 10 and the AP 100 is established. Moreover, case A2 is a case after the ending of case A1. That is, at the start time of case A2, also, the AP connection information 40*b* is not registered in the AP information registration region 34*b* of the printer 10, and the wired NW information 42*c* is not registered in the wired information registration region 34*c*. At the start time of case A2, also, the operating state of the NFC I/F 24 is the first operating state.

In A21, the user of the portable terminal 80 inputs the predetermined sending instruction, for sending the AP connection information to the printer 10, to the portable terminal 80. Next, in A22, the user of the portable terminal 80 brings the portable terminal 80 closer to the printer 10.

In T50, the first NFC connection between the NFC I/F of the portable terminal 80 and the NFC I/F 24 of the printer 10 is established by the distance between these I/Fs becoming less than the predetermined distance.

In T52, the printer 10 receives a Select Request from the portable terminal 80 (YES in S10) and, in T54, sends an OK signal to the portable terminal 80 (S12). Next, in T56, the printer 10 receives a Write command including the AP connection information from the portable terminal 80 (YES in S14).

Next, in T58, the printer 10 sends a Wi-Fi connection request to the AP 100 (S61 of FIG. 4) and, in T60, establishes a Wi-Fi connection with the AP 100 (S62). Thereby, the printer 10 joins the AP NW formed by the AP 100. Next, in T62 the printer 10 receives the AP NW information from the AP 100, and in T64, T66, registers the AP connection information and the AP NW information in the AP information registration region 34*b* (S64, S66). Next, in T68, the printer 10 provides the AP NW information to the NFC I/F 24 (S68). Thereby, the AP NW information (see reference number 42*b* of FIG. 1) is stored in the I/F memory 26 of the printer 10. Next, in T70, the printer 10 shifts the operating state of the NFC I/F 24 from the first operating state to the second operating state (i.e., CE mode is OFF, R/W mode and P2P mode are ON) (S52 of FIG. 3).

Then, in A31, the user of the portable terminal 90 inputs a sending instruction to the portable terminal 90. Next, in A32, the user of the portable terminal 90 brings the portable terminal 90 closer to the printer 10.

In T80, a second NFC connection between the NFC I/F of the portable terminal 90 and the NFC I/F 24 of the printer 10 is established by the distance between these I/Fs becoming less than the predetermined distance.

In T82, the CPU 32 of the printer 10 acquires the notification from the NFC I/F 24 (YES in S80 of FIG. 4) and, in T84, provides the WFD connection information 40a in the WFD information registration region 34a and the AP NW information 42b in the AP information registration region 34b to the NFC I/F 24 (S82 of FIG. 4). In T86, the processor 25 sends the WFD connection information 40a and the AP NW information 42b to the portable terminal 90 (S36 of FIG. 2).

Since the sending instruction has been input and the print instruction has not been input to the portable terminal 90, the portable terminal 90 does not send the Wi-Fi connection request to the printer 10.

Therefore, in T88, the printer 10 does not receive the Wi-Fi connection request from the portable terminal 90. Further, the printer 10 does not receive the Write command including the AP connection information from the portable terminal 90. In this case, as shown in T90, the printer 10 does not overwrite the AP connection information 40b in the AP information registration region 34b with new AP connection information.

As described above, in the present embodiment, after the AP connection information 40b has been registered in the AP information registration region 34b, the printer 10 does not receive the Write command including the AP connection information from the portable terminal 90. Moreover, by shifting the operating state of the NFC I/F 24 from the first operating state to the second operating state, it can be said that the printer 10 is prohibiting the NFC I/F 24 from receiving the Write command including the AP connection information. Therefore, the printer 10 can prevent the AP connection information 40b registered in the AP information registration region 34b from being replaced by other AP connection information.

(Case A3; FIG. 7)

Case A3 shows a case in which the printer 10 receives print data from the portable terminals 80, 90 and performs a print after a Wi-Fi connection with the AP 100 has been established. Moreover, case A3 is a case after the ending of case A2 (FIG. 6). That is, at the start time of case A3, the printer 10 has established a Wi-Fi connection with the AP 100. The NFC I/F 24 of the printer 10 operates in the second operating state.

In A41, the user of the portable terminal 80 inputs a predetermined print instruction to the portable terminal 80. Next, in A42, the user of the portable terminal 80 brings the portable terminal 80 closer to the printer 10.

In T100, a second NFC connection is established.

In T102, upon acquiring the notification from the NFC I/F 24 (S80 of FIG. 4), in T104, the CPU 32 of the printer 10 provides the WFD connection information 40a and the AP NW information 42b to the NFC I/F 24 (S82). In T106, the processor 25 sends the WFD connection information 40a and the AP NW information 42b to the portable terminal 80 (S36 of FIG. 2).

As described above, in the present embodiment, in a situation where the NFC I/F 24 is set in the second operating state, the printer 10 can send the WFD connection information 40a to the portable terminal 80.

Upon receiving the WFD connection information 40a and the AP NW information 42b (T106), the portable terminal 80 attempts a Wi-Fi communication with the printer 10 via the AP 100 by using the received AP NW information. In this case, the Wi-Fi communication succeeds. Therefore, the portable terminal 80 can confirm that both the portable terminal 80 and the printer 10 belong to the AP NW formed by the AP 100.

In T108, T110, the printer 10 receives print data from the portable terminal 80 via the AP 100. In this case, the printer 10 does not receive the Wi-Fi connection request including the WFD connection information from the portable terminal 80. In T112, the printer 10 performs a print in accordance with the received print data.

Then, in A51, the user of the portable terminal 90 inputs the print instruction to the portable terminal 90. Next, in A52, the user of the portable terminal 90 brings the portable terminal 90 closer to the printer 10.

Then, the printer 10 performs, with the portable terminal 90, the same processes as T100 to T106 described above.

Upon receiving the WFD connection information 40a and the AP NW information 42b (T106), the portable terminal 90 attempts a Wi-Fi communication with the printer 10 via the AP 110 by using the received AP NW information. In this case, the Wi-Fi communication fails. Consequently, the portable terminal 90 can confirm that the portable terminal 90 and the printer 10 are not belonging to a common AP NW.

In T120, the printer 10 receives a Wi-Fi connection request including the SSID in the WFD connection information from the portable terminal 90 (YES in S70 of FIG. 4) and, in T122, establishes a Wi-Fi connection with the portable terminal 90 (S72). Next, upon receiving print data from the portable terminal 90 in T124, in T126 the printer 10 performs a print in accordance with the received print data (S74). Next, in T128, the printer 10 disconnects the Wi-Fi connection with the portable terminal 90 (S76).

(Advantage of Present Embodiment)

In the present embodiment, as shown in the example of FIG. 6, upon receiving the AP connection information 40b, the printer 10 can establish a Wi-Fi connection with the AP 100 by using this AP connection information (T60). Then, after the AP connection information received from the portable terminal 80 has been registered in the AP information registration region 34b, the printer 10 does not receive other AP connection information from the portable terminal 90. The printer 10 maintains the registration of the AP connection information 40b already registered in the AP information registration region 34b without registering (i.e. overwriting) the other AP connection information instead of the registered AP connection information 40b. Therefore, in the present embodiment, it is possible to prevent the registration of the AP connection information in a situation where the AP connection information is not to be registered. Moreover, the printer can also be said to be prohibiting reception and registration of the other AP connection information.

Further, in the present embodiment, as shown in the example of FIG. 7, after the Wi-Fi connection with the AP 100 has been established, the printer 10 can send the AP NW information 42b to the portable terminal 90 in addition to the WFD connection information 40a (T106). By attempting a Wi-Fi communication with the printer 10 using the AP NW information, the portable terminal 80 (90) which has received the AP NW information 42b can confirm whether the portable terminal 80 (90) is belonging to the AP NW formed by the AP 100, in the same manner as the printer 10. In the example of FIG. 7, it is possible to confirm that the portable terminal 80 is belonging to the AP NW formed by the AP 100. Therefore, the printer 10 and the portable terminal 80 do not need to establish a Wi-Fi connection by using the WFD connection information.

(Correspondence Relationship)

The printer 10, the portable terminal 80, and the portable terminal 90 are examples of "communication apparatus", "first terminal device", "second terminal device", respectively. Further, the NFC I/F 24, the Wi-Fi I/F 22, and the wired I/F 20 are examples of "first interface", "second interface", "third interface", respectively. The NFC scheme is an example of "first communication scheme". The Wi-Fi scheme is an example of "second communication scheme". The controller 30, the main memory 34, the AP information registration region 34b, and the WFD information registration region 34a are examples of "apparatus controller", "apparatus memory", "first registration region", and "second registration region", respectively. The processor 25, the I/F memory 26, and the buffer 27 are examples of "interface controller", "first interface memory", and "second interface memory", respectively. The AP connection information received from the portable terminal 80 of FIG. 6 is an example of "specific access point information". The WFD connection information 40a is an example of "parent station information". The AP NW information 42b is an example of "wireless communication information". The portable terminals 80, 90 of the examples of FIG. 5 and FIG. 7 are examples of "third terminal device". The Read command is an example of "specific signal".

S50, S52 of FIG. 3 are examples of "setting the operating state of the first interface in the first operating state . . . ", "setting the operating state of the first interface in the second operating state . . . ", respectively. S64 of FIG. 4 is an example of "registering the specific access point information in the first registration region . . . ". S42 of FIG. 3 is an example of "causing the second registration region to store the parent station information". S44 of FIG. 3 is an example of "causing the interface memory to store the parent station information". S82 of FIG. 4 is an example of "providing, . . . , the parent station information to the first interface". S62 is an example of "establishing . . . ".

S14, S16 of FIG. 2 are examples of "receiving the specific access point . . . ", "providing the specific access point information . . . ", respectively. S26 and S28 are an example of "sending, . . . , the parent station information to a third terminal device". S32 is an example of "providing a predetermined notification . . . ". S36 is an example of "sending, . . . , the provided parent station information to the second terminal device".

Specific examples of the technology disclosed in the present specification are described above in detail, but these examples are merely illustrative and place no limitation on the scope of the patent claims. The technology described in the patent claims also encompasses various changes and modifications to the specific examples described above. Modifications of the above embodiment are listed below.

(Modification 1) In the embodiment, the processor 25 provides the AP connection information, which was received from the target terminal and stored temporarily in the buffer 27, to the controller 30 without storing the AP connection information in the I/F memory 26 (see S16 of FIG. 2). The configuration is not limited to this, and the processor 25 may provide the AP connection information, which was received from the target terminal and stored temporarily in the buffer 27, to the controller 30 after having stored the AP connection information in the I/F memory 26.

(Modification 2) In the embodiment, the CPU 32 provides the WFD connection information 40a to the NFC I/F 24, and causes the I/F memory 26 to store the WFD connection information 40a (see S68, etc. of FIG. 4). Upon receiving the Read command from the target terminal, the processor 25 sends the WFD connection information 40a being stored in the I/F memory 26 to the target terminal (see S28 of FIG. 2). The configuration is not limited to this, and the CPU 32 may not provide the WFD connection information 40a to the NFC I/F 24. That is, the WFD connection information 40a may not be stored in the I/F memory 26. In this case, upon receiving the Read command from the target terminal, the processor 25 may provide to the controller 30 a specific notification indicating that the Read command has been received. Upon acquiring the specific notification from the NFC I/F 24, the CPU 32 may provide the WFD connection information 40a in the main memory 34 to the NFC I/F 24. Upon acquiring the WFD connection information 40a from the controller 30, the processor 25 may send the acquired WFD connection information 40a to the target terminal. According to the present modification, the printer 10 can send the WFD connection information 40a to the target terminal without causing the I/F memory 26 to store the WFD connection information 40a.

(Modification 3) In the embodiment, when the wired I/F 20 is linked down, the CPU 32 deletes, from the I/F memory 26, the wired NW information 42c that is being stored in the I/F memory 26. The configuration is not limited to this and, even if the wired I/F 20 is linked down, the CPU 32 may not delete, from the I/F memory 26, the wired NW information 42c that is being stored in the I/F memory 26.

(Modification 4) In the embodiment, upon establishing a Wi-Fi connection with the target AP, the CPU 32 receives the AP NW information from the target AP (see S62 of FIG. 4). The CPU 32 registers the received AP NW information in the AP information registration region 34b (see S66). Instead, the CPU 32 may not receive the AP NW information from the target AP. For example, the CPU 32 may use information (e.g., subnet mask, etc.) stored in advance in the main memory 34 as at least a part of the AP NW information.

(Modification 5) In the embodiment, the communication system 2 has been described, as an example, that is provided with the printer 10 which is capable of performing the print function. The communication apparatus provided in the communication system is not limited to the printer, but may be a multi-function device capable of performing various functions such as print function, scanner function, copy function, FAX function, etc. Further, the communication apparatus may be a scanner capable of performing only the scanner function. These devices are also examples of "communication apparatus".

(Modification 6) In the embodiment, in the case where the power of the printer 10 is turned ON, the CPU 32 prepares the WFD connection information and the WFD NW information, and registers the WFD connection information and the WFD NW information in the WFD information registration region 34a (S42 of FIG. 3). Further, the CPU 32 causes the I/F memory to store the WFD connection information (S44). The configuration is not limited to this, and the CPU 32 may update the WFD connection information and the WFD NW information each predetermined time interval. Further, the CPU 32 may update the WFD connection information and the WFD NW information each time the Wi-Fi connection in the WFD NW is disconnected. In these cases, the CPU 32 may register new WFD connection information and new WFD NW information in the WFD information registration region 34a each time the new WFD connection information and the new WFD NW information are prepared. Further, the CPU 32 may store the new WFD connection information in the I/F memory.

(Modification 7) In the embodiment, in a case where the operating state of the NFC I/F 24 is set in the first operating state, the NFC I/F 24 operates as a Type 4 NFC tag. Instead, in the case where the operating state of the NFC I/F 24 is set in the first operating state, the NFC I/F 24 may operate as a Type 3 NFC tag. In that case, when the power of the printer 10 is turned ON, the processor 25 may monitor whether the Write command including the AP connection information is received from the target terminal, whether the Read command is received from the target terminal, and whether the second NFC connection is established.

(Modification 8) Further, the printer 10 and the portable terminals 80, 90 may, instead of the NFC I/Fs, be Bluetooth I/Fs for performing a wireless communication in accordance with the Bluetooth scheme (called "BT communication" below). The Bluetooth I/F of this modification is also an example of "first interface".

(Modification 9) In the embodiment, in the case where the operating state of the NFC I/F 24 of the printer 10 is set in the second operating state, CE mode is OFF, and R/W mode and P2P mode are ON. The configuration is not limited to this, and in the case where the operating state of the NFC I/F 24 of the printer 10 is set in the second operating state, if CE mode is OFF, one of R/W mode and P2P mode may be ON, and the other thereof may be OFF.

(Modification 10) In the embodiment, the NFC I/F 24 of the printer 10 is the NFC forum device which operates in the first operating state, in which CE mode is ON and R/W mode and P2P mode are OFF, and the second operating state, in which CE mode is OFF and R/W mode and P2P mode are ON. The configuration is not limited to this, and the NFC I/F 24 may be an NFC tag. In this modification, a state in which prohibition information which prohibits processing for the Write command is not being stored in the memory of the NFC tag may be the first operating state, and a state in which the prohibition information is being stored may be the second operating state. Further, in the case of the first operating state, by sending an OK signal indicating that it is possible to process the Write command for the Select Request from the target terminal, the NFC I/F 24 may, for the Write command from the target terminal, receive the Write command including the AP connection information in the same manner as in the embodiment, and perform the processes of the embodiment described above. On the other hand, in the case of the second operating state, by sending an NG signal indicating that it is not possible to process the Write command for the Select Request from the target terminal, the NFC I/F 24 may not receive the Write command from the target terminal.

(Modification 11) In the embodiment, the Write command including the AP connection information is not received from the target terminal in the case where the wired I/F 20 is linked up. The configuration is not limited to this, and the Write command including the AP connection information may be received from the target terminal in the case where the wired I/F 20 is linked up.

(Modification 12) In the embodiments, each process of FIG. 2 to FIG. 4 is implemented by software (i.e., program). However, at least one process of the processes of FIG. 2 to FIG. 4 may be implemented by hardware such as a logic circuit.

What is claimed is:

1. A communication apparatus comprising:
a first interface configured to perform wireless communication in accordance with a first communication scheme, the first interface being set in one of a plurality of operating modes including a first operating mode and a second operating mode different from the first operating mode;
a second interface configured to perform wireless communication in accordance with a second communication scheme different from the first communication scheme;
an apparatus memory comprising a first registration region in which access point information is to be registered, the access point information being for establishing a wireless connection with an access point via the second interface; and
an apparatus controller, wherein the first interface is configured to perform:
in a case where the access point information is not registered in the first registration region, setting the operating mode of the first interface to the first operating mode for registering the access point information,
wherein the apparatus controller is configured to perform:
registering the access point information in the first registration region, the access point information being received from a terminal device by the first interface set in the first operating mode; and
in a case where the access point information is registered in the first registration region, setting the operating mode of the first interface to the second operating mode, and
wherein the apparatus controller does not register the access point information in the first registration region in a case where the first interface is set in the second operating mode.

2. The communication apparatus as in claim 1, wherein the first communication scheme is an NFC (abbreviation of Near Field Communication) scheme in accordance with an NFC standard,
the first interface is an NFC forum device of the NFC standard,
the first operating mode includes a mode where a CE (abbreviation of Card Emulation) mode of the NFC standard is activated and both of a P2P (abbreviation of Peer to Peer) mode of the NFC standard and a R/W (abbreviation of Reader/Writer) mode of the NFC standard are invalidated, and
the second operating mode includes a mode where the CE mode is invalidated and at least one of the P2P mode and the R/W mode is activated.

3. The communication apparatus as in claim 1, wherein the first interface comprises an interface controller,
the interface controller is configured to perform:
receiving the access point information from the terminal device, in the case where the wireless connection between the communication apparatus and the terminal device via the first interface is established in a situation where the first interface is set in the first operating mode; and
providing the access point information to the apparatus controller in a case where the access point information is received,
even in a case where the wireless connection between the communication apparatus and the terminal device via the first interface is established in a situation where the first interface is set in the second operating mode, the access point information is not received from the terminal device, and
the registering of the access point information in the first registration region is performed in a case where the access point information is provided from the first interface.

4. The communication apparatus as in claim 1, wherein the first interface comprises an interface controller, the apparatus memory further comprises a second registration region in which parent station information is to be registered, the parent station information being for establishing a wireless connection with the communication apparatus operating as a parent station of a wireless network via the second interface, the apparatus controller is further configured to perform causing the second registration region to store the parent station information, and the interface controller is configured to perform sending the parent station information to the terminal device in a case where a wireless connection between the communication apparatus and the terminal device via the first interface is established in a situation where the first interface is set in the first operating mode, and a specific signal is received from the terminal device.

5. The communication apparatus as in claim 4, wherein the first interface further comprises an interface memory, the apparatus controller is further configured to perform causing the interface memory to store the parent station information, the sending of the parent station information includes reading out the parent station information from the interface memory and sending the parent station information that was read out to the terminal device, in the case where the wireless connection between the communication apparatus and the terminal device via the first interface is established in the situation where the first interface is set in the first operating mode, and the specific signal is received from the terminal device.

6. The communication apparatus as in claim 5, wherein the interface controller is further configured to perform providing a predetermined notification to the apparatus controller without receiving the specific signal from the terminal device in a case where the wireless connection between the communication apparatus and the terminal device via the first interface is established in a situation where the first interface is set in the second operating mode, the apparatus controller is further configured to perform providing, in a case where the predetermined notification is provided from the first interface, the parent station information to the first interface, and the interface controller is further configured to perform, in a case where the parent station information is provided from the apparatus controller in response to the predetermined notification being provided to the apparatus controller, sending the provided parent station information to the terminal device.

7. The communication apparatus as in claim 6, wherein the apparatus controller is further configured to perform establishing a wireless connection between the communication apparatus and the access point via the second interface by using the access point information after the access point information has been registered in the first registration region, the providing of the parent station information includes providing, in a case where the predetermined notification is provided from the first interface after the wireless connection between the communication apparatus and the access point via the second interface has been established, both of the parent station information and wireless communication information for performing a wireless communication with the communication apparatus via the access point to the first interface, and the sending of the provided parent station information includes sending, in a case where both of the parent station information and the wireless communication information are provided from the apparatus controller in response to the predetermined notification being provided to the apparatus controller, both of the provided parent station information and the provided wireless communication information to the terminal device.

8. The communication apparatus as in claim 1, wherein the first interface comprises:
   an interface memory; and
   an interface controller, the interface memory comprises a first interface memory for storing information which is to be sent to an external and a second interface memory for storing information which is to be received from the external, and the interface controller is configured to perform providing the access point information, which is received from the terminal device and stored in the second interface memory, to the apparatus controller, without causing the first interface memory to store the access point information.

9. The communication apparatus as in claim 1, further comprising
   a third interface configured to perform a wired communication,
   wherein the setting of the operating mode of the first interface in the first operating mode is performed in a case where the access point information is not registered in the first registration region and the third interface is not linked up, and
   the setting of the operating mode of the first interface in the second operating mode is performed in a case where the access point information is not registered in the first registration region and the third interface is linked up.

10. A non-transitory computer-readable medium storing computer-readable instructions for a communication apparatus, wherein
    the communication apparatus comprises:
      a first interface configured to perform wireless communication in accordance with a first communication scheme, the first interface being set in one of a plurality of operating modes including a first operating mode and a second operating mode different from the first operating mode;
      a second interface configured to perform wireless communication in accordance with a second communication scheme different from the first communication scheme;
      an apparatus memory comprising a first registration region in which access point information is to be registered, the access point information being for establishing a wireless connection with an access point via the second interface; and
      an apparatus controller,
    wherein the first interface is configured to perform:
      in a case where the access point information is not registered in the first registration region, setting the operating mode of the first interface to the first operating mode for registering the access point information,
    the computer-readable instructions, when executed by the apparatus controller, cause the communication apparatus to perform:

registering the access point information in the first registration region, the access point information being received from a terminal device by the first interface set in the first operating mode; and in a case where the access point information is registered in the first registration region, setting the operating mode of the first interface to the second operating mode, and wherein the computer-readable instructions do not cause the communication apparatus to register the access point information in the first registration region in a case where the first interface is set in the second operating mode.

11. A method performed by an apparatus controller of a communication apparatus, wherein the communication apparatus comprises:

a first interface configured to perform wireless communication in accordance with a first communication scheme, the first interface being set in one of a plurality of operating modes including a first operating mode and a second operating mode different from the first operating mode;

a second interface configured to perform wireless communication in accordance with a second communication scheme different from the first communication scheme;

an apparatus memory comprising a first registration region in which access point information is to be registered, the access point information being for establishing a wireless connection with an access point via the second interface; and wherein the first interface is configured to perform:

in a case where the access point information is not registered in the first registration region, setting the operating mode of the first interface to the first operating mode for registering the access point information, the method comprising:

registering the access point information in the first registration region, the access point information being received from a terminal device by the first interface set in the first operating mode; and in a case where the access point information is registered in the first registration region, setting the operating mode of the first interface to the second operating mode, and wherein the access point information is not registered in the first registration region in a case where the first interface is set in the second operating mode.

* * * * *